(12) United States Patent
Lin et al.

(10) Patent No.: US 8,311,415 B2
(45) Date of Patent: Nov. 13, 2012

(54) FREQUENCY UP-CONVERSION SYSTEM AND METHOD FOR THE SAME

(75) Inventors: Chun Ting Lin, Dadu Township, Taichung County (TW); Wen Jr Jiang, Tucheng (TW); Jyehong Chen, Zhubei (TW); Sien Chi, Hsinchu (TW); Dar Zu Hsu, Xigang Township, Tainan County (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 243 days.

(21) Appl. No.: 12/760,915

(22) Filed: Apr. 15, 2010

(65) Prior Publication Data

US 2011/0170879 A1    Jul. 14, 2011

(30) Foreign Application Priority Data

Jan. 8, 2010 (TW) .............................. 99100342 A

(51) Int. Cl.
*H04B 10/00* (2006.01)
*H04B 10/04* (2006.01)
(52) U.S. Cl. ........ 398/183; 398/161; 398/163; 398/185; 398/198
(58) Field of Classification Search .................. 398/115, 398/158, 159, 161, 163, 183, 185, 188, 198
See application file for complete search history.

(56) References Cited

U.S. PATENT DOCUMENTS

| | | | | |
|---|---|---|---|---|
| 6,091,864 A | * | 7/2000 | Hofmeister | 385/2 |
| 6,765,708 B2 | * | 7/2004 | Davies | 359/238 |
| 7,006,772 B2 | | 2/2006 | Kuri et al. | |
| 7,239,396 B2 | * | 7/2007 | Krause et al. | 356/477 |
| 7,773,883 B1 | * | 8/2010 | Weng et al. | 398/83 |
| 2004/0136730 A1 | * | 7/2004 | Fuse et al. | 398/188 |
| 2010/0021166 A1 | * | 1/2010 | Way | 398/79 |

OTHER PUBLICATIONS

G. Qi, J. P. Yao, J. Seregelyi, C. Bélisle, and S. Paquet, "Generation and distribution of a wide-band continuously tunable millimeter-wave signal with an optical external modulation technique," IEEE Trans. Microw. Theory Tech., vol. 53, No. 10, pp. 3090-3097, Oct. 2005.
H.Chi, J.Yao, "Frequency Quadrupling and Upconversion in a Radio Over Fiber Link," IEEE Journal of Lightwave Technology, vol. 26, No. 15, pp. 2706-2711, Aug. 2008.
J. Zhang, H. Chen, M. Chen, T. Wang, and S. Xie, "A photonic microwave frequency quadrupler using two cascaded intensity modulators with repetitious optical carrier suppression," IEEE Photon. Technol. Lett., vol. 19, No. 14, pp. 1057-1059, Jul. 2007.

* cited by examiner

*Primary Examiner* — Dalzid Singh
(74) *Attorney, Agent, or Firm* — Egbert Law Offices, PLLC

(57) ABSTRACT

A frequency up-conversion system includes an optical splitter, an optical modulator, an optical phase-shifter, and an optical coupler. In one embodiment of the present disclosure, the optical splitter is configured to split an optical wave into a first optical wave and a second optical wave, the optical modulator is configured to modulate the first optical wave to form a modulation wave, the optical phase-shifter is configured to shift the phase of the second optical wave by a predetermined phase to form a shifting wave, and the optical coupler is configured to couple the modulation wave and the shifting wave. In one embodiment of the present disclosure, the optical modulator and the optical phase-shifter are connected in a parallel manner.

23 Claims, 14 Drawing Sheets

FREQUENCY UP-CONVERSION SYSTEM AND METHOD FOR THE SAME

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a frequency up-conversion system and method for the same, and, more particularly, to a frequency up-conversion system with an optical modulator and an optical phase shifter connected in parallel and a frequency up-conversion method for the same.

2. Description of Related Art

Including Information Disclosed Under 37 CFR 1.97 and 37 CFR 1.98.

Current conventional network architectures using coaxial cable and twisted pair cable as the transmission medium cannot satisfy the users' requirement for high-speed transmission of data and high definition videos. Fiber-to-the-x (FTTx), based on the passive optical fibers, has been widely used in the wired high speed transmission services to provide transmission of voice, video and data. In addition, Radio over Fiber (RoF) is receiving increasing attention in research and development due to the rapidly increasing bandwidth needs of wireless communication.

FIG. 1 illustrates the conventional RoF architecture. As the bandwidth for wireless transmission increases, the carrier frequency increases accordingly. However, the transmission distance of the wireless microwave signal decreases as the carrier frequency increases. To solve this problem, the RoF technique uses the low loss property of the fiber transmission to effectively extend the service area of the wireless network, by loading the radio frequency signal onto the optical fiber for transmitting to the desired area, converting the radio frequency signal into the wireless high frequency signal using the optical-to-electrical converter, and transmitting the wireless high frequency signal to the user by the antenna, as shown in FIG. 1.

FIG. 2 illustrates the conventional hybrid access network architecture. Recently, there has been intensive research on the hybrid access network technique, which integrates the FTTx technique and the RoF technique. The hybrid access network technique effectively uses the existing optical fiber network to provide the transmission service for voice, video and data, so that the construction cost of the telecommunication entity on the wireless network can be dramatically decreased. However, the transmitting end needs an oscillation to generate the high frequency wireless signal carrier for high frequency transmission, and all the devices at the transmitting end must be able to work at such high frequency.

In the near future, the transmission rate will be increased to 10 Gbps in the high-definition multimedia interface (HDMI) 1.3. In response to this development, international companies including Intel, LG Electronics, Panasonic, NEC, Samsung, SiBEAM, SONY, and Toshiba have formed a WirelessHD Consortium to discuss the feasibility of using the 60 GHz carrier to transmit high-definition multimedia information. The 60 GHz carrier possesses the 7 GHz wideband characteristic and is very suitable for transmitting the high-definition multimedia information. However, to transmit data at this frequency band, all the devices at the transmitting end, including the oscillator, power amplifier, etc., need to operate at such high frequency, which dramatically increases the system complexity and construction cost.

The RoF technique can use the optical fiber with bandwidth of several tens of THz and very low transmission loss to carry the wireless high frequency signal to the service area several kilometers away. In addition, the RoF technique can implement the double frequency up-conversion by using the special RoF optical transmitter design. For example, a quadrupling frequency up-conversion can implement 60 GHz from a 15 GHz wireless signal such that the operation frequency of the electrical devices at the transmitting end can be dramatically decreased. Consequently, in addition such decreases in system complexity, the building cost of the entire system also decreases since low frequency devices with lower cost can be used to build the system.

BRIEF SUMMARY OF THE INVENTION

One aspect of the present invention provides a frequency up-conversion system with an optical modulator and an optical phase shifter connected in parallel and a frequency up-conversion method for the same.

A frequency up-conversion system according to this aspect of the present invention comprises an optical splitter configured to split an input wave into a first optical wave and a second optical wave, an optical modulator configured to modulate the first optical wave based on an electrical wave to generate a modulation wave, an optical phase shifter configured to shift the second optical wave by a predetermined phase to generate a shifting wave, and an optical coupler configured to couple the modulation wave and the shifting wave to generate an optical output wave.

Another aspect of the present disclosure discloses a frequency up-conversion system including first and second up-conversion apparatuses. Each up-conversion apparatus comprises an optical splitter configured to split an input wave into a first optical wave and a second optical wave, an optical modulator configured to modulate the first optical wave based on an electrical wave to generate a modulation wave, an optical phase shifter configured to shift the second optical wave by a predetermined phase to generate a shifting wave, and an optical coupler configured to couple the modulation wave and the shifting wave to generate an optical output wave, wherein the optical splitter of the second up-conversion apparatus is connected to the optical coupler of the first up-conversion apparatus.

Another aspect of the present disclosure discloses a frequency up-conversion method comprising the steps of providing an input wave, splitting the input wave into a first optical wave and a second optical wave, modulating the first optical wave based on an electrical wave to generate a modulation wave, shifting the second optical wave by a predetermined phase to generate a shifting wave, and coupling the modulation wave and the shifting wave to generate an optical output wave, wherein the phase of the shifting wave is opposite to that of the modulation wave.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed might be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the disclosure.

DETAILED DESCRIPTION OF THE INVENTION

Figure 1:
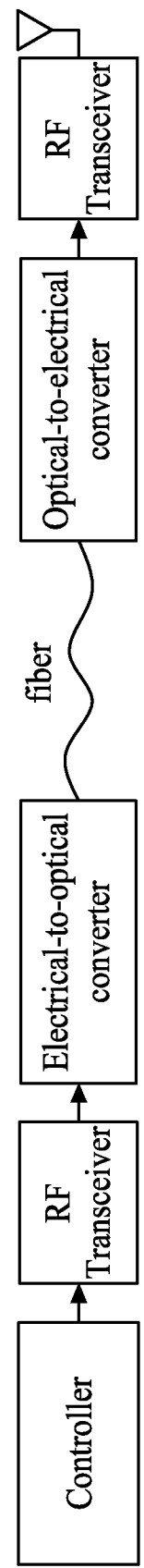
FIG. 1 illustrates a schematic view of the conventional RoF architecture.
Figure 2:
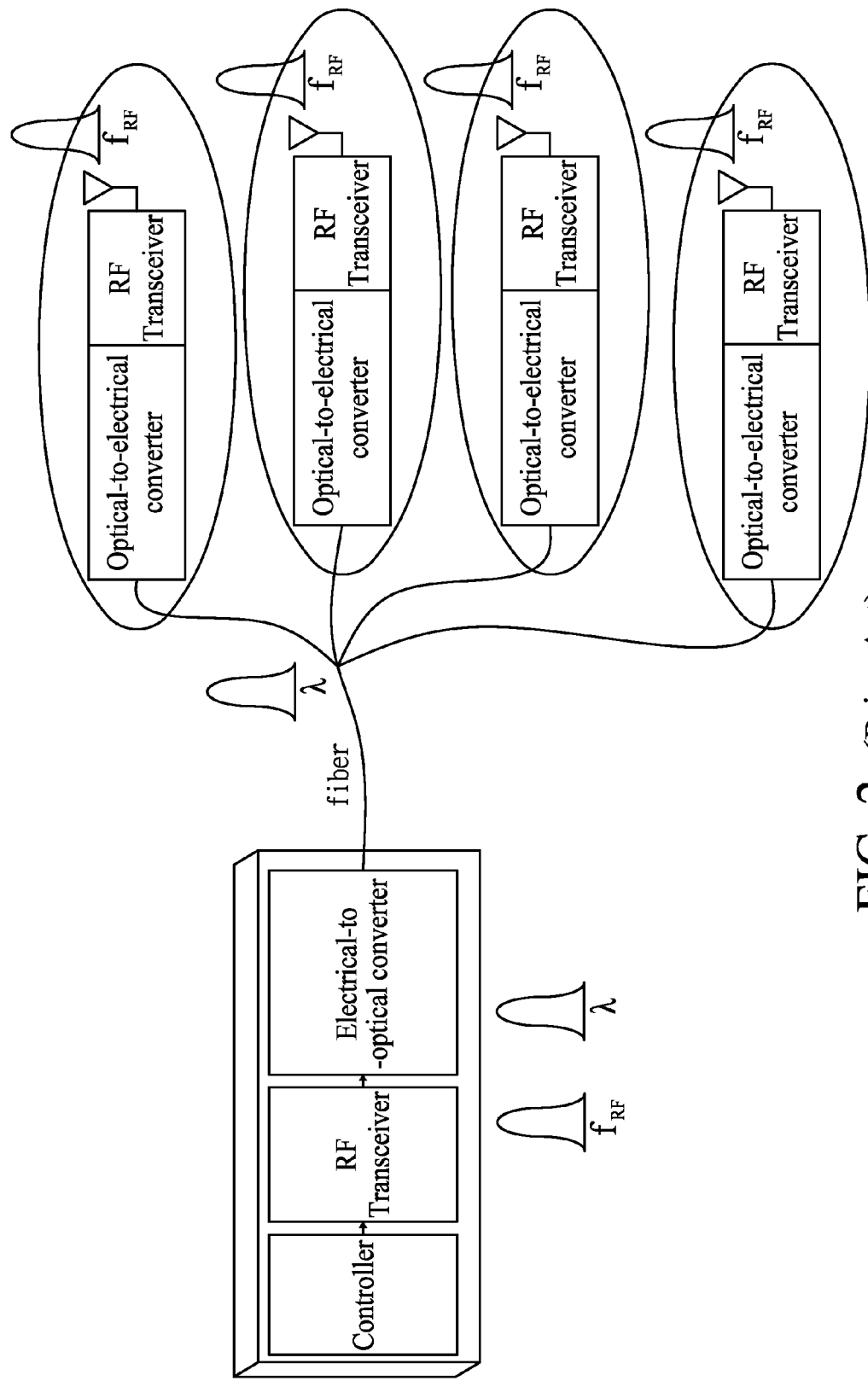
FIG. 2 illustrates a schematic view of the conventional hybrid access network architecture.
Figure 3:
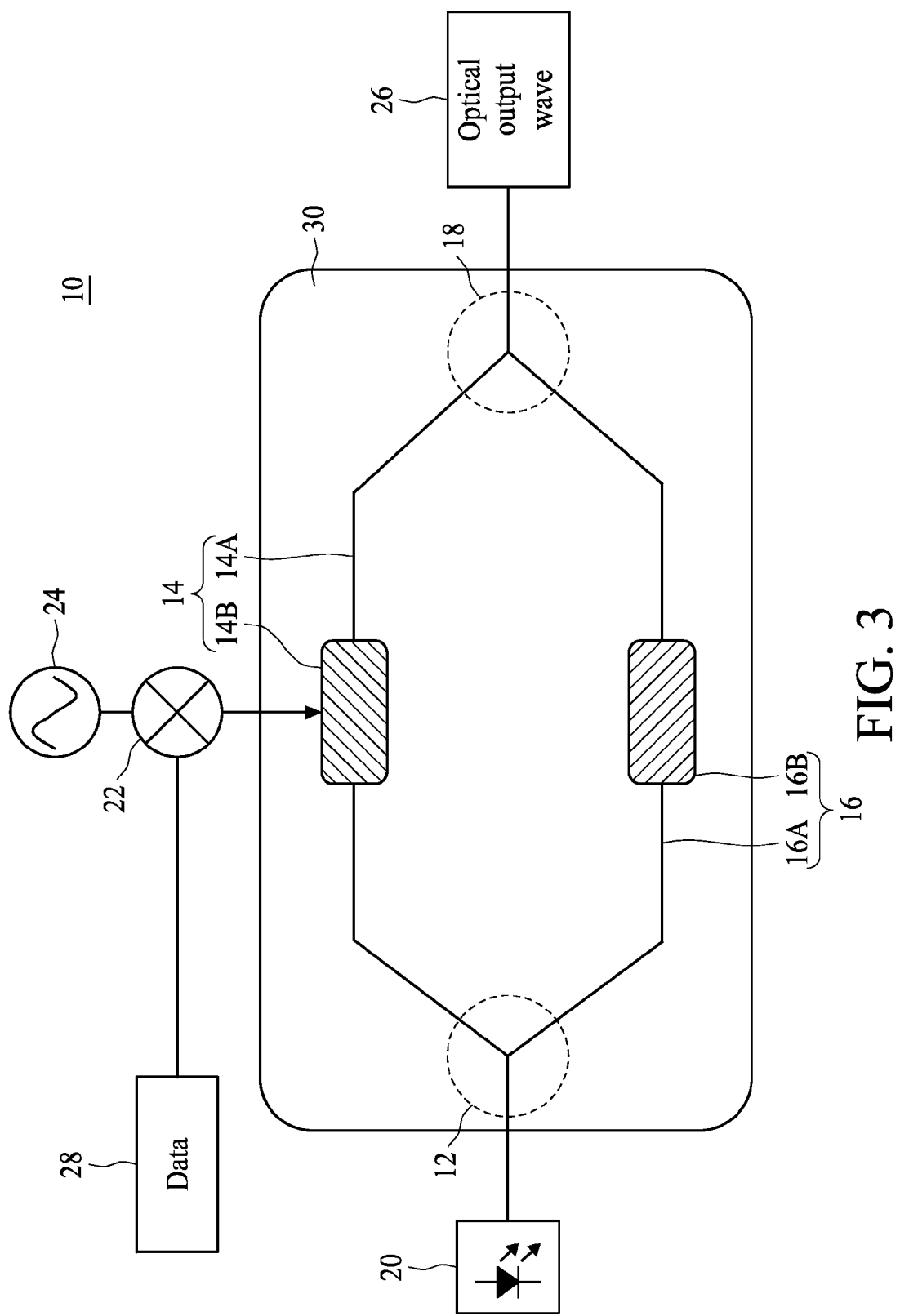
FIG. 3 illustrates a schematic view of a frequency up-conversion system according to one embodiment of the present disclosure.

FIG. 3 illustrates a frequency up-conversion system 10 according to one embodiment of the present disclosure. The frequency up-conversion system 10 comprises an optical splitter 12 configured to split an input wave into a first optical wave and a second optical wave, an optical modulator 14 configured to modulate the first optical wave based on an electrical wave to generate a modulation wave, an optical phase shifter 16 configured to shift the second optical wave by a predetermined phase to generate a shifting wave, and an optical coupler 18 configured to couple the modulation wave and the shifting wave to generate an optical output wave 26.

In one embodiment of the present disclosure, the frequency up-conversion system 10 further comprises a laser source 20 coupled to the optical splitter 12, and the laser source 20 is configured to generate the input wave. In one embodiment of the present disclosure, the frequency up-conversion system 10 further comprises a mixer 22 coupled to the optical modulator 14, and an electrical wave generator 24 coupled to the mixer 22, wherein the electrical wave generator 24 is configured to generate an electrical input wave and the mixer is configured to generate the electrical wave from the electrical input wave and the data 28.

In one embodiment of the present disclosure, the optical modulator 14, the optical phase shifter 16, the optical splitter 12 and the optical coupler 18 are formed in a substrate such as a lithium niobate substrate. In one embodiment of the present disclosure, the optical modulator 14 includes an optical waveguide 14A and a modulation electrode 14B positioned on the optical waveguide 14A, and the optical phase shifter 16 includes an optical waveguide 16A and a phase-shifting electrode 16B positioned on the optical waveguide 16A, and the optical splitter 12 and the optical coupler 18 are Y-shaped optical waveguides. In one embodiment of the present disclosure, the optical modulator 14 is configured to be a double-sideband modulator, and the optical modulator 14 and the optical phase shifter 16 are connected in parallel.

Figure 4:
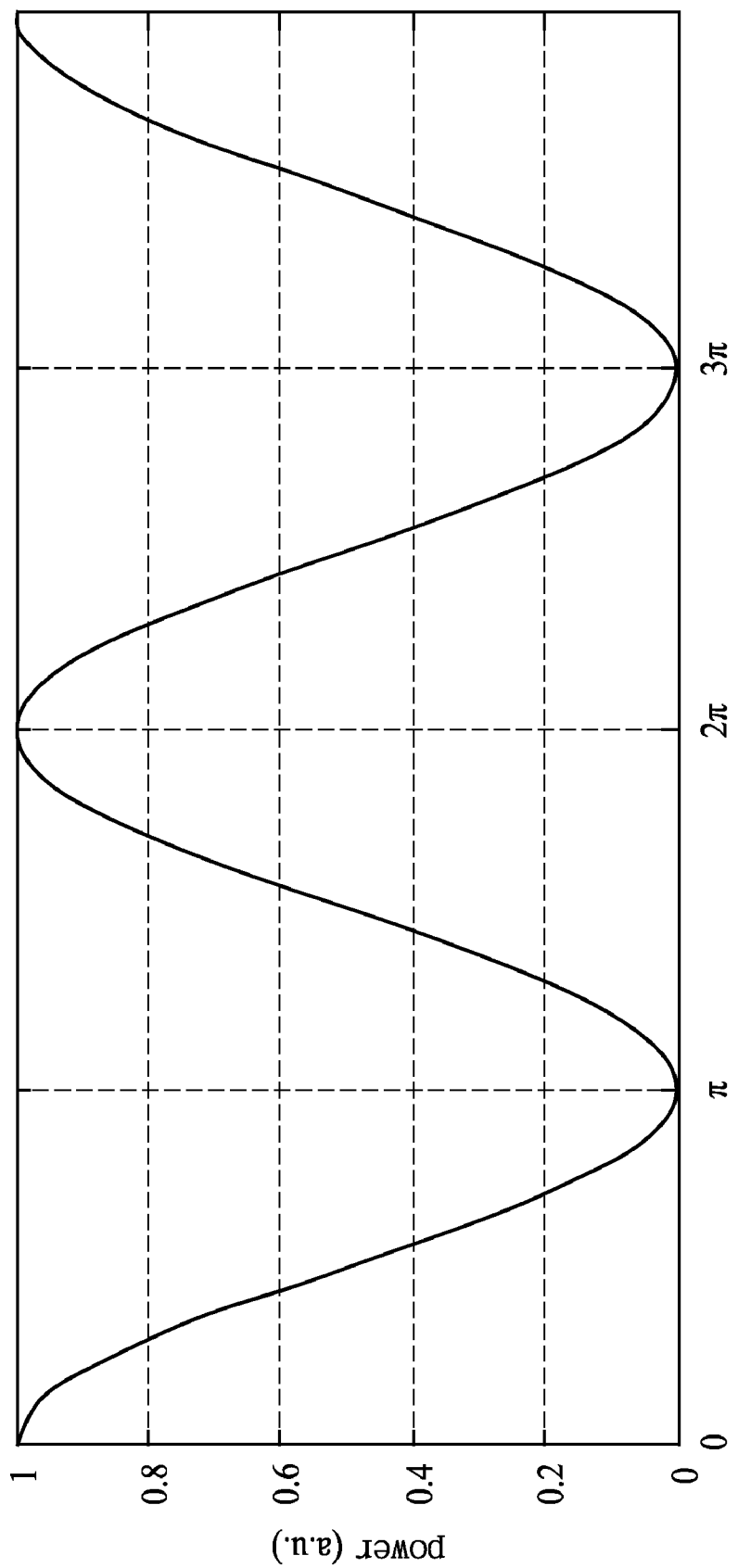
FIG. 4 illustrates a graphical view of a transfer curve of the optical modulator according to one embodiment of the present disclosure.

FIG. 4 illustrates a transfer curve of the optical modulator 14 according to one embodiment of the present disclosure. Biasing the optical modulator 14 at $V\pi$ (the bottom of the transfer curve) results in elimination of the optical carrier signal and even-order sidebands of the subcarrier signal. In contrast, biasing the optical modulator 14 at $2V\pi$ (the peak of the transfer curve) results in elimination of all of the odd-order sidebands of the subcarrier signal while the optical carrier signal and the even-order sidebands of the subcarrier signal remain.

Figure 5:
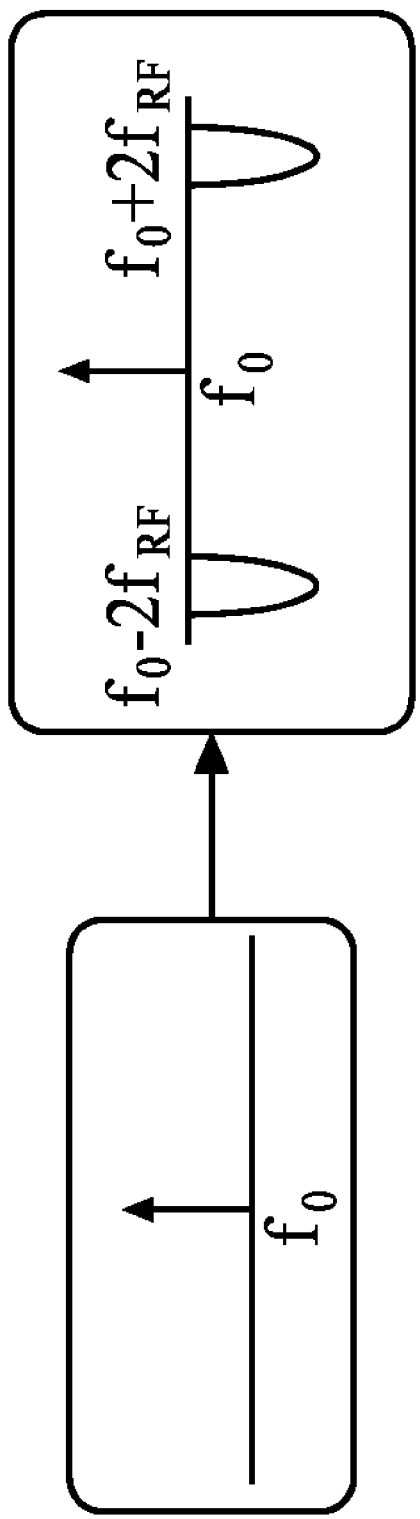
FIGS. 5 to 7 illustrate schematic views of the spectrum variation of the frequency up-conversion system according to one embodiment of the present disclosure.
Figure 6:
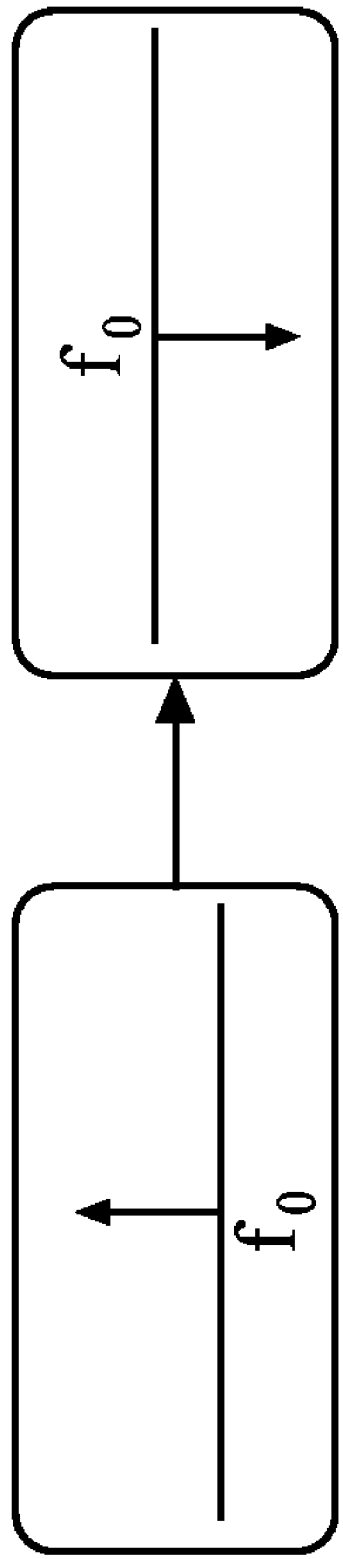
Figure 7:
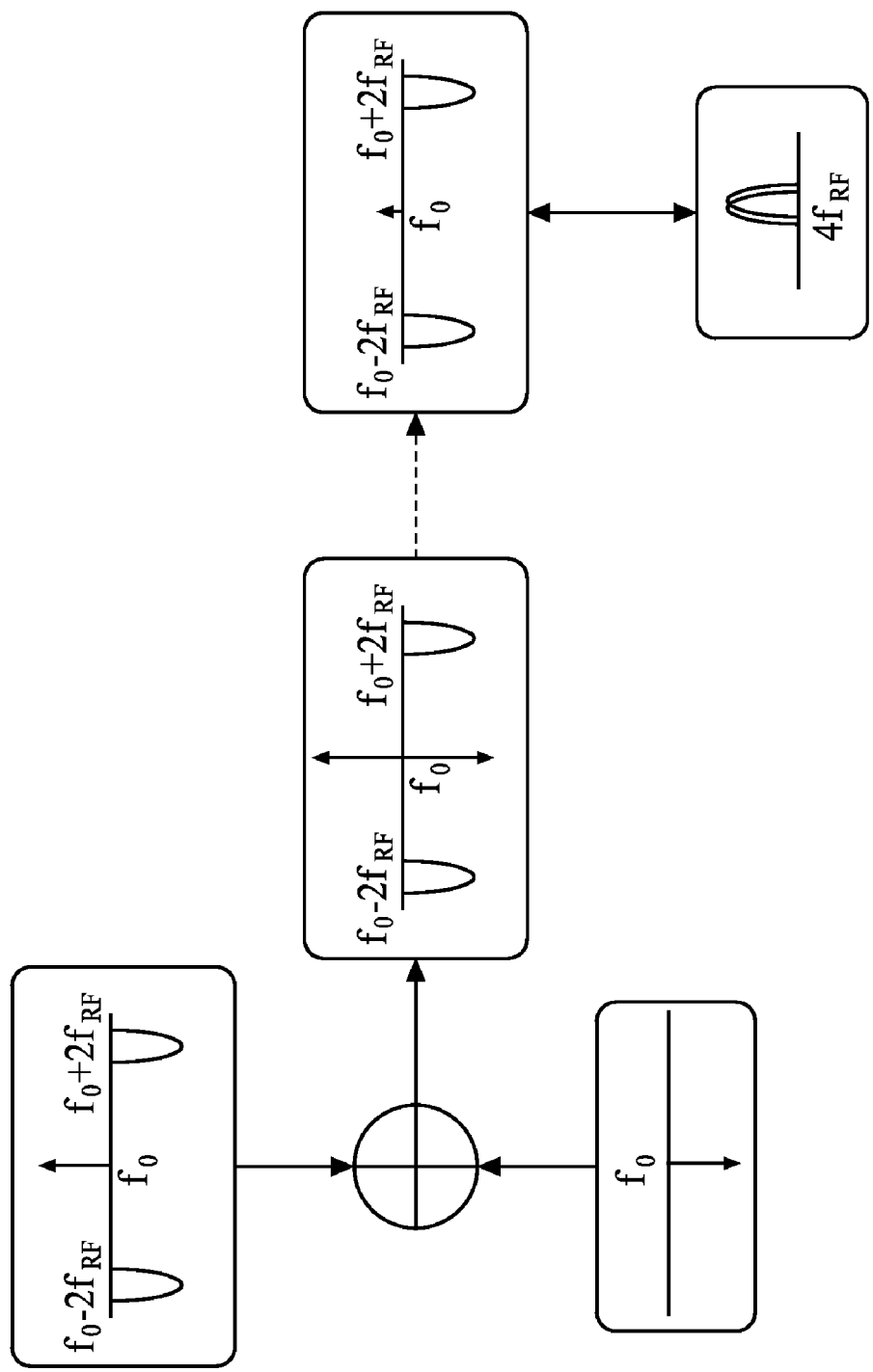

FIGS. 5 to 7 illustrate the spectrum variation of the frequency up-conversion system 10 according to one embodiment of the present disclosure. Referring to FIG. 5, in one embodiment of the present disclosure, the first optical wave ($f_0$) propagating in the optical waveguide 14A is modulated by the mixer 22 based on the electrical input wave ($f_{RF}$) to form the modulation wave. In one embodiment of the present disclosure, the optical modulator 14 is biased at $2V\pi$ such that the signal of the odd-order sidebands of the subcarrier of the first optical wave ($f_0$) is eliminated while the signals of first optical wave and the even-order sidebands of the subcarrier remain. The electrical input wave ($f_{RF}$) is modulated to the two sides from the first optical wave ($f_0$) by a frequency $2f_{RF}$, i.e., the modulation wave including a right sideband ($f_0+2f_{RF}$) and a left sideband ($f_0-2f_{RF}$).

Referring to FIG. 6, in one embodiment of the present disclosure, the phase of the second optical wave ($f_0$) propagating in the optical waveguide 16A is shifted by the optical phase shifter 16 by the predetermined phase (for example, 180 degrees) to generate the shifting wave such that the phase of the shifting wave is opposite to that of the modulation wave. The optical coupler 18 couples the shifting wave with the modulation wave to form the optical output wave 26. Since the phase of the shifting wave is opposite to that of the modulation wave, the first optical wave ($f_0$) and the second optical ($f_0$) form destructive interference to eliminate one another, and only the RF signal with frequency of $f_0+2f_{RF}$ and $f_0-2f_{RF}$. Subsequently, as the receiver with square law effect receives the optical output wave 26, the RF signal is at $4f_{RF}$. In other words, the frequency ($4f_{RF}$) of the optical output wave 26 is the integral time of the frequency ($f_{RF}$) of the electrical input wave, and the frequency quadrupling up-conversion is implemented without using the filter, as shown in FIG. 7.

Figure 8:
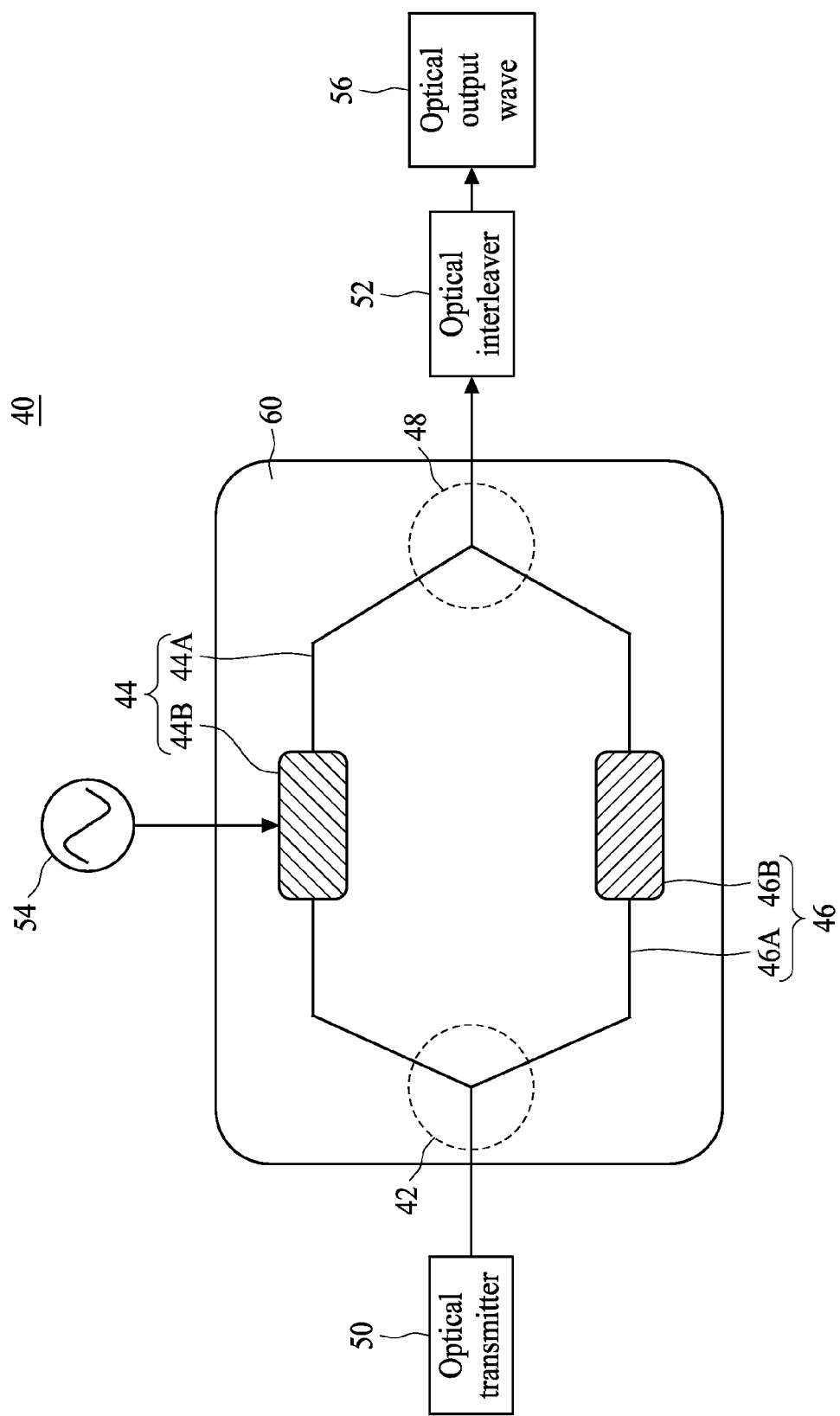
FIG. 8 illustrates a schematic view of a frequency up-conversion system according to one embodiment of the present disclosure.

FIG. 8 illustrates a frequency up-conversion system 40 according to one embodiment of the present disclosure. The frequency up-conversion system 40 comprises an optical splitter 42 configured to split an input wave into a first optical wave and a second optical wave, an optical modulator 44 configured to modulate the first optical wave to generate a modulation wave based on an electrical wave, an optical phase shifter 46 configured to shift the second optical wave by a predetermined phase to generate a shifting wave, and an optical coupler 48 configured to couple the modulation wave and the shifting wave to generate an optical output wave.

In one embodiment of the present disclosure, the frequency up-conversion system 40 further comprises an optical transmitter 50 coupled to the input terminal of the optical splitter 42, and the optical transmitter 50 is configured to generate the input wave. In one embodiment of the present disclosure, the frequency up-conversion system 40 further comprises an optical interleaver 52 coupled to an output terminal of the optical coupler 48. In one embodiment of the present disclosure, the frequency up-conversion system 40 further comprises an electrical wave generator 54 coupled to the optical modulator 44, and the electrical wave generator 54 is configured to generate an electrical input wave serving as the applied electrical wave to the optical modulator 44.

In one embodiment of the present disclosure, the optical modulator 44, the optical phase shifter 46, the optical splitter 42 and the optical coupler 48 are formed in a substrate such as a lithium niobate substrate. In one embodiment of the present disclosure, the optical modulator 44 includes an optical waveguide 44A and a modulation electrode 44B positioned on the optical waveguide 44A, and the optical phase shifter 46 includes an optical waveguide 46A and a phase-shifting electrode 46B positioned on the optical waveguide 46A, and the optical splitter 42 and the optical coupler 48 are Y-shaped optical waveguides. In one embodiment of the present disclosure, the optical modulator 44 is a double-sideband modulator, and the optical modulator 44 and the optical phase shifter 46 are connected in parallel.

Figure 9:
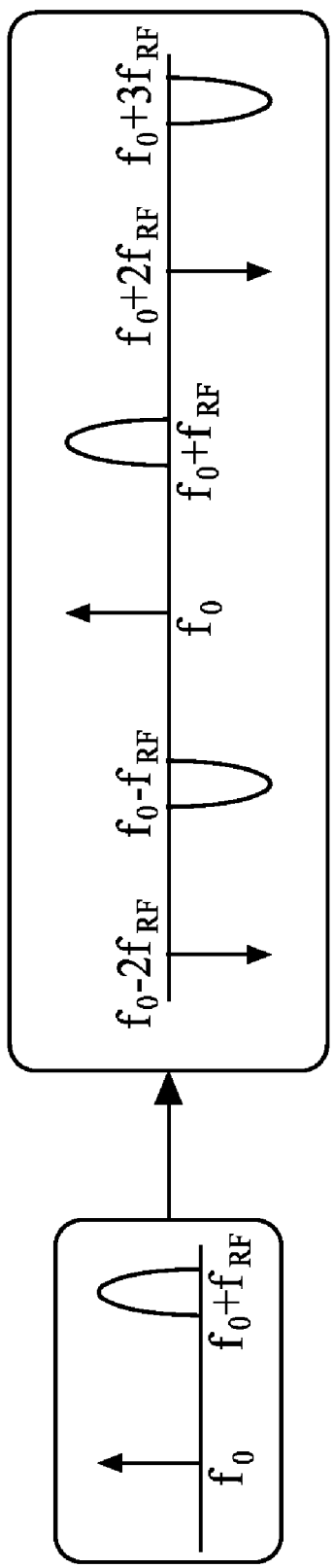
FIGS. 9 to 11 illustrate schematic views of the spectrum variation of the frequency up-conversion system according to one embodiment of the present disclosure.
Figure 10:
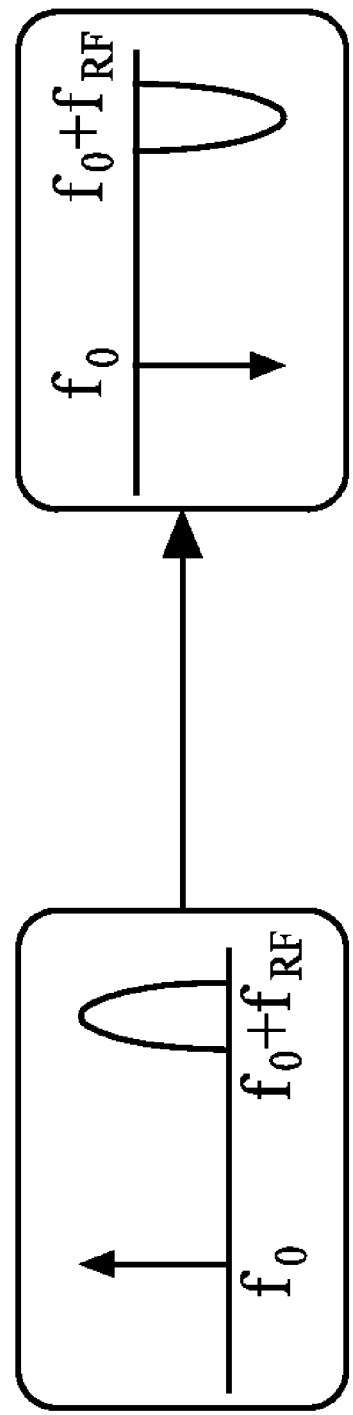
Figure 11:
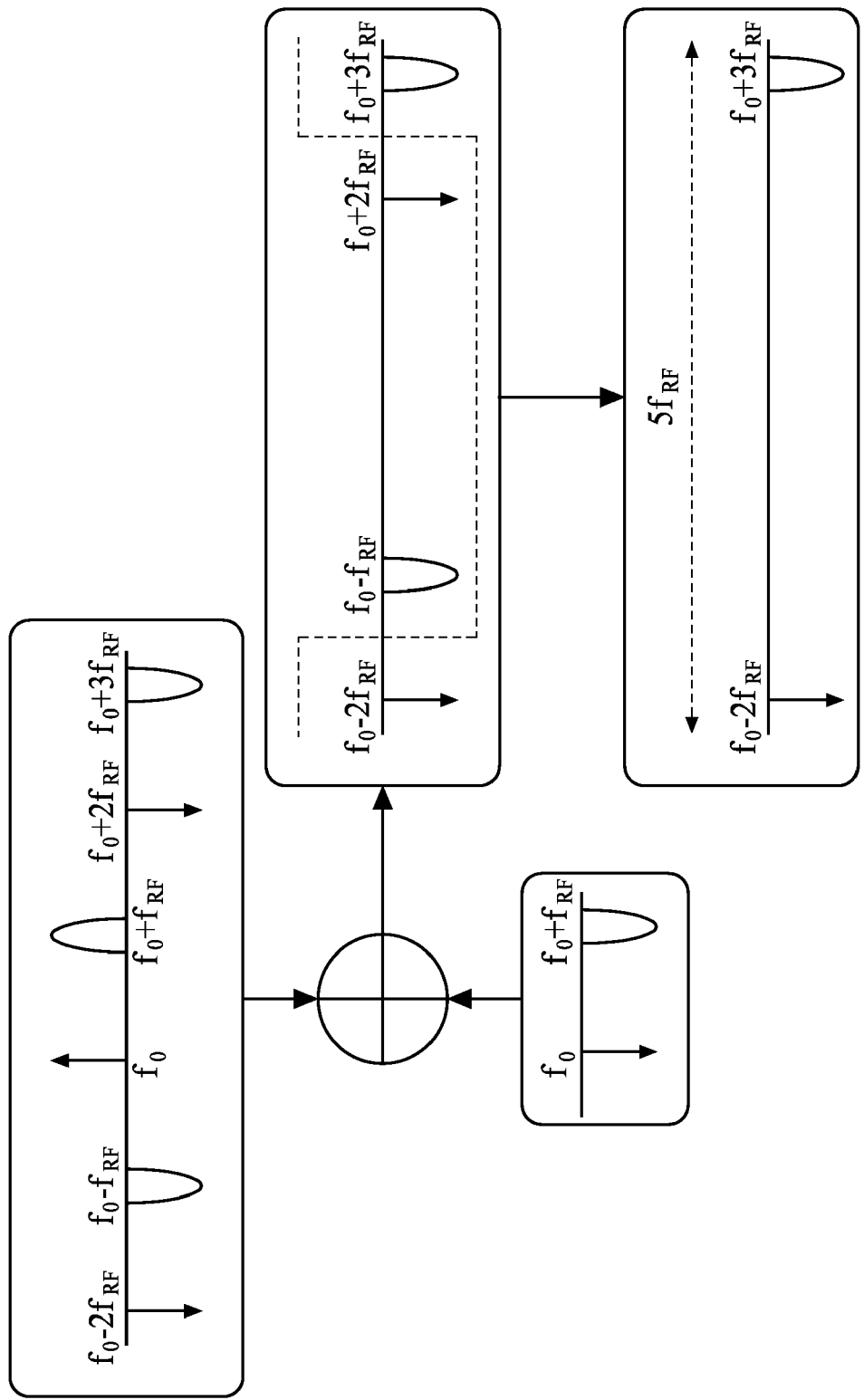

FIGS. 9 to 11 illustrate the spectrum variation of the frequency up-conversion system 40 according to one embodiment of the present disclosure. Referring to FIG. 9, in one embodiment of the present disclosure, the optical transmitter 50 is an RoF optical module configured to output an optical carrier ($f_0$) and an RF signal subcarrier ($f_0+f_{RF}$), and both the optical carrier ($f_0$) and the RF signal subcarrier ($f_0+f_{RF}$) can be considered as the optical input wave for the backend optical devices. The optical input wave with two optical signals of $f_0$ and $f_{RF}$ in the optical waveguide 44A is modulated based on the electrical input wave ($f_{RF}$) to form the modulation wave.

In one embodiment of the present disclosure, the optical modulator 44 is biased at 2 $V\pi$ such that the odd-order sidebands signal of the optical subcarrier of the optical carrier ($f_0$) of the optical input wave is eliminated while the signals of optical carrier ($f_0$) and the even-order sidebands ($f_0+2f_{RF}$ and $f_0-2f_{RF}$) of the optical subcarrier remain. Similarly, the signals of the RF signal subcarrier ($f_0+f_{RF}$) and the even-order sidebands ($f_0+3f_{RF}$ and $f_0-f_{RF}$) of the RF signal subcarrier ($f_0+f_{RF}$) also remain. The electrical input wave ($f_{RF}$) is modulated to the two sides from the optical carrier ($f_0$) by a frequency $2f_{RF}$.

Referring to FIG. 10, in one embodiment of the present disclosure, the phase of the optical input wave ($f_0$) with two optical signals of $f_0$ and $f_{RF}$ in the optical waveguide 46A is shifted by the optical phase shifter 46 by the predetermined phase (for example, 180 degrees) to generate the shifting wave such that the phase of the shifting wave is opposite to that of the modulation wave. The optical coupler 48 couples the shifting wave with the modulation wave to form an optical output wave. Since the phase of the shifting wave is opposite to that of the modulation wave, destructive interference occurs and the waves eliminate one another such that only four RF signals with frequencies of $f_0+3\,f_{RF}$, $f_0+2\,f_{RF}$, $f_0-f_{RF}$ and $f_0-2\,f_{RF}$ in the optical output wave.

In one embodiment of the present disclosure, the interleaver 52 filters the two RF signals with frequencies of $f_0+3\,f_{RF}$ and $f_0-2\,f_{RF}$ from the optical output wave to generate the optical output wave 56. As the receiver with square effect receives the optical output wave 56, the RF signal is located at 5 $f_{RF}$. In other words, the frequency (5 $f_{RF}$) of the optical output wave 56 is the integral time (quintuple) of the frequency ($f_{RF}$) of the electrical input wave, and the frequency up-conversion of quintuple is implemented, as shown in FIG. 11.

Figure 12:
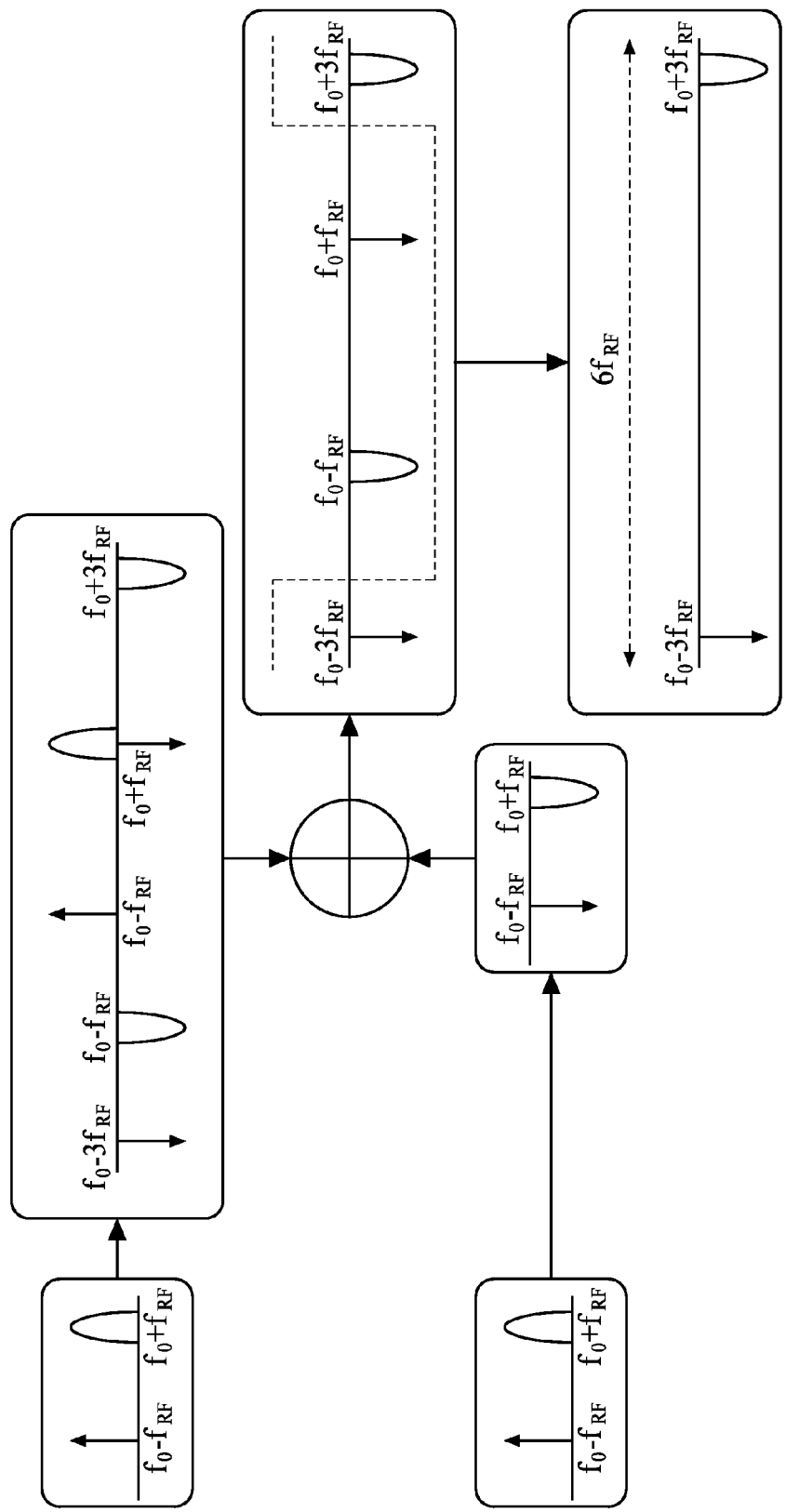
FIG. 12 illustrates a schematic view of the spectrum variation of the frequency up-conversion system according to another embodiment of the present disclosure.

FIG. 12 illustrates the spectrum variation of the frequency up-conversion system 40 according to another embodiment of the present disclosure. In one embodiment of the present disclosure, the optical transmitter 50 is an RoF optical module configured to output an optical carrier ($f_0-f_{RF}$) and an RF signal subcarrier ($f_0+f_{RF}$) with frequency difference of 2 $f_{RF}$, and both the optical carrier ($f_0-f_{RF}$) and the RF signal subcarrier ($f_0+f_{RF}$) can be considered as a single optical input wave for the backend optical devices. The optical carrier ($f_0-f_{RF}$) and the RF signal subcarrier ($f_0+f_{RF}$) from the optical transmitter 50 are up-converted by the up-conversion system 40 to generate the optical output wave 56, the receiver with square effect then receives the optical output wave 56, and the RF signal is at 6 $f_{RF}$. In other words, the frequency (6 $f_{RF}$) of the optical output wave 56 is the integral time (sextuple) of the frequency ($f_{RF}$) of the electrical input wave, and the frequency up-conversion of the sextuple is implemented.

Figure 13:
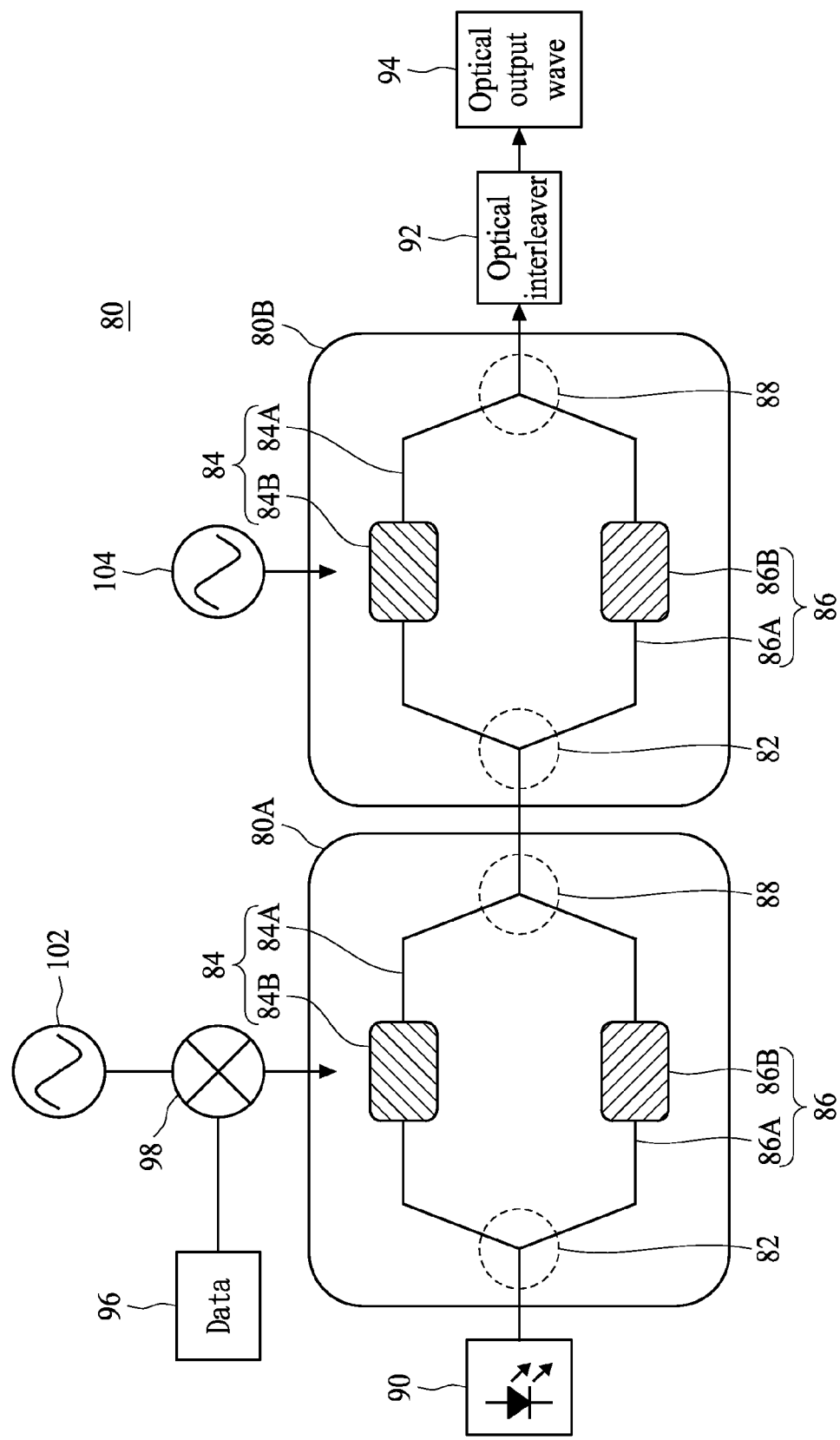
FIG. 13 illustrates a schematic view of a frequency up-conversion system according to one embodiment of the present disclosure.

FIG. 13 illustrates a frequency up-conversion system 80 according to one embodiment of the present disclosure. The frequency up-conversion system 80 comprises a first up-conversion apparatus 80A and a second up-conversion apparatus 80B. Each of the first up-conversion apparatus 80A and the second up-conversion apparatus 80B comprises an optical splitter 82 configured to split an input wave into a first optical wave and a second optical wave, an optical modulator 84 configured to modulate the first optical wave to generate a modulation wave based on an electrical wave, an optical phase shifter 86 configured to shift the second optical wave by a predetermined phase to generate a shifting wave, and an optical coupler 88 configured to couple the modulation wave and the shifting wave to generate an optical output wave. The optical splitter 82 of the second up-conversion apparatus 80B is coupled to the optical coupler 88 of the first up-conversion apparatus 80A.

In one embodiment of the present disclosure, the frequency up-conversion system 80 further comprises a laser source 90 coupled to an input terminal of the optical splitter 82 of the first up-conversion apparatus 80A, and the laser source 90 is configured to generate the input wave. In one embodiment of the present disclosure, the frequency up-conversion system 80 further comprises a mixer 98 coupled to the optical modulator 84 of the first up-conversion apparatus 80A, and an electrical wave generator 102 coupled to the mixer 98, wherein the electrical wave generator 102 is configured to generate an electrical input wave and the mixer 98 is configured to generate the electrical wave from the electrical input wave and the data 96. In one embodiment of the present disclosure, the frequency up-conversion system 80 further comprises an electrical wave generator 104 coupled to the optical coupler 84 of the second up-conversion apparatus 80B. In one embodiment of the present disclosure, the frequency up-conversion system 80 further comprises an optical interleaver 92 coupled to an output terminal of the optical coupler 88 of the second up-conversion apparatus 80B.

In one embodiment of the present disclosure, the optical modulator 84, the optical phase shifter 86, the optical splitter 82 and the optical coupler 88 are formed in a substrate such as a lithium niobate substrate. In one embodiment of the present disclosure, the optical modulator 84 includes an optical waveguide 84A and a modulation electrode 84B positioned on the optical waveguide 84A, and the optical phase shifter 86 includes an optical waveguide 86A and a phase-shifting electrode 86B positioned on the optical waveguide 86A, and the optical splitter 82 and the optical coupler 88 are Y-shaped optical waveguides. In one embodiment of the present disclosure, the optical modulator 84 is configured to be a double-sideband modulator, and the optical modulator 84 and the optical phase shifter 86 are connected in parallel.

Figure 14:
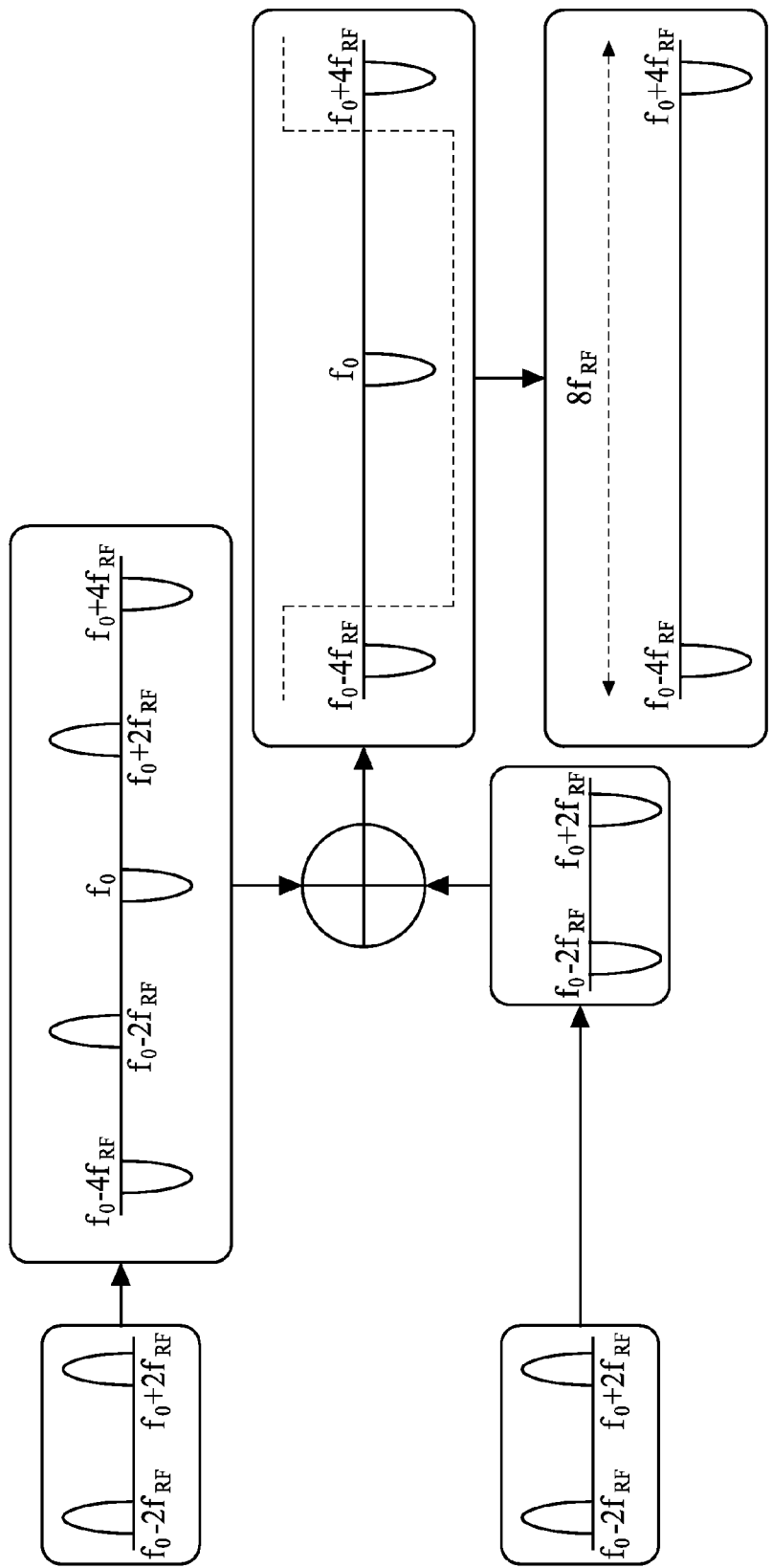
FIG. 14 illustrates a schematic view of the spectrum variation of the frequency up-conversion system according to one embodiment of the present disclosure.

FIG. 14 illustrates the spectrum variation of the frequency up-conversion system 80 according to one embodiment of the present disclosure. Referring to FIG. 14, in one embodiment of the present disclosure, the first up-conversion apparatus 80A outputs an input wave including an optical carrier and an RF signal subcarrier with frequency difference of 4 $f_0$, as shown in FIGS. 3 to 7. After the input wave propagates through the second up-conversion apparatus 80B, the interleaver 92 filters the optical carrier and the RF signals at the two outmost sides to generate the optical output wave 94. Subsequently, as the receiver with square effect receives the optical output wave 94, the RF signal is at 8 $f_{RF}$. In other words, the frequency (8 $f_{RF}$) of the optical output wave 94 is the integral time (eight times) of the frequency ($f_{RF}$) of the electrical input wave, and the frequency up-conversion of eight times is implemented.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A frequency up-conversion system comprising:
   an optical splitter configured to split an input wave into a first optical wave and a second optical wave;
   an optical modulator configured to modulate the first optical wave based on an electrical wave to generate a modulation wave, wherein the optical modulator is biased at 2V$\pi$;
   an optical phase shifter configured to shift the second optical wave by a predetermined phase to generate a shifting wave, wherein the shifting wave is not modulated and the predetermined phase is opposite to a phase of the second optical wave;
   an optical coupler configured to couple the modulation wave and the shifting wave to generate an optical output wave; and
   an optical interleaver coupled to an output terminal of said optical coupler, wherein the optical interleaver is configured to filter the optical output wave such that one or more frequency components between an outermost optical carrier or a signal subcarrier in one of an upper sideband and a lower sideband and a signal subcarrier in the other of the upper sideband and lower sideband are filtered out.

2. The frequency up-conversion system of claim 1, wherein said optical modulator comprises:
   an optical waveguide; and
   an electrode positioned on said optical waveguide.

3. The frequency up-conversion system of claim 1, wherein said optical phase shifter comprises:
   an optical waveguide; and
   an electrode positioned on said optical waveguide.

4. The frequency up-conversion system of claim 1, further comprising a laser source coupled to said optical splitter, said laser source being configured to generate the input wave.

5. The frequency up-conversion system of claim 1, further comprising:
   a mixer coupled to said optical modulator; and
   an electrical wave generator coupled to said mixer.

6. The frequency up-conversion system of claim 5, wherein said electrical wave generator is configured to generate an electrical input wave, a frequency of the optical output wave is double a frequency of the electrical input wave.

7. The frequency up-conversion system of claim 1, further comprising an electrical wave generator coupled to said optical modulator.

8. The frequency up-conversion system of claim 1, wherein the input wave has a spectrum including an optical carrier and an RF signal subcarrier, the frequency of the optical carrier is $f_0$, and the frequency of the RF signal subcarrier is $f_0+f_{RF}$.

9. The frequency up-conversion system of claim 8, wherein a frequency of the optical output wave is five times a frequency of the input wave.

10. The frequency up-conversion system of claim 1, wherein the input wave has a spectrum including an optical carrier and an RF signal subcarrier, a frequency of the optical carrier is $f_0-f_{RF}$, and a frequency of the RF signal subcarrier is $f_0+f_{RF}$.

11. The frequency up-conversion system of claim 10, wherein the electrical wave generator is configured to generate an electrical input wave, the optical coupler is configured to generate an optical output wave, and the frequency of the optical output wave is six times the frequency of the electrical input wave.

12. The frequency up-conversion system of claim 1, wherein said optical modulator and said optical phase shifter are connected in parallel.

13. The frequency up-conversion system of claim 1, wherein the input wave has a spectrum including a first RF signal subcarrier and a second RF signal subcarrier, the frequency of the first RF signal subcarrier is $f_0-2f_{RF}$, and the frequency of the RF signal subcarrier is $f_0+2f_{RF}$.

14. The frequency up-conversion system of claim 13, wherein the electrical wave generator is configured to generate an electrical input wave, and the frequency of the optical output wave is eight times the frequency of the electrical input wave.

15. A frequency up-conversion method, comprising the steps of:
   providing an input wave;
   splitting the input wave into a first optical wave and a second optical wave;
   modulating the first optical wave based on an electrical wave to generate a modulation wave, wherein a spectrum of the modulation wave comprises one or more frequency components the same as one or more frequency components of the first optical wave and further comprises even-order harmonics of the one or more frequency components of the first optical wave as sidebands;
   shifting the second optical wave by a predetermined phase to generate a shifting wave, wherein the shifting wave is not modulated and the phase of the shifting wave is opposite to the phase of the second optical wave;
   coupling the modulation wave and the shifting wave to generate an optical output wave;
   filtering the optical output wave such that one or more frequency components between the outermost optical carrier or signal subcarrier in one of an upper sideband and a lower sideband and signal subcarrier in the other of the upper sideband and lower sideband is filtered.

16. The frequency up-conversion method of claim 15, wherein the frequency of the optical output wave is the integral time of the frequency of the optical input wave.

17. The frequency up-conversion method of claim 15, wherein the frequency of the input wave is $f_0$, and the frequency of the optical output wave is $4f_0$.

18. The frequency up-conversion method of claim 15, wherein the spectrum of the input wave includes an optical carrier and an RF signal subcarrier, the frequency of the optical carrier is $f_0$, and the frequency of the RF signal subcarrier is $f_0+f_{RF}$.

19. The frequency up-conversion method of claim 15, wherein the frequency of the optical output wave is five times the frequency of the electrical wave.

20. The frequency up-conversion method of claim 15, wherein the spectrum of the input wave includes an optical carrier and an RF signal subcarrier, the frequency of the optical carrier is $f_0-f_{RF}$, and the frequency of the RF signal subcarrier is $f_0+f_{RF}$.

21. The frequency up-conversion method of claim 15, wherein the frequency of the optical output wave is six times the frequency of the electrical wave.

22. The frequency up-conversion method of claim 15, wherein the modulation wave and the shifting wave form destructive interference in the step of coupling the modulation wave and the shifting wave to generate an optical output wave.

23. The frequency up-conversion method of claim 15, wherein the predetermined phase is 180 degrees.

* * * * *